US005688864A

United States Patent [19]
Goodwin

[11] Patent Number: 5,688,864
[45] Date of Patent: Nov. 18, 1997

[54] AUTOPHOBIC WATER REPELLENT SURFACE TREATMENT

[75] Inventor: George B. Goodwin, Mars, Pa.

[73] Assignee: PPG Industries, Inc., Pittsburgh, Pa.

[21] Appl. No.: 734,156

[22] Filed: Oct. 21, 1996

Related U.S. Application Data

[63] Continuation of Ser. No. 458,149, Jun. 1, 1995, abandoned, which is a continuation-in-part of Ser. No. 220,353, Mar. 30, 1994, abandoned, which is a continuation-in-part of Ser. No. 589,235, Sep. 28, 1990, Pat. No. 5,308,705, which is a continuation-in-part of Ser. No. 503,587, Apr. 3, 1990, Pat. No. 4,983,459.

[51] Int. Cl.$^6$ ................................................. C08G 77/24
[52] U.S. Cl. ............... 524/858; 106/287.14; 106/287.16; 427/387; 428/447; 428/429
[58] Field of Search ................. 524/858; 106/287.14, 106/287.16; 427/387; 428/447, 429

[56] References Cited

U.S. PATENT DOCUMENTS

| | | | |
|---|---|---|---|
| 3,859,320 | 1/1975 | Atherton | 260/448.2 N |
| 3,950,588 | 4/1976 | McDougal | 442/80 |
| 4,024,306 | 5/1977 | Takamizawa et al. | 427/387 |
| 4,263,371 | 4/1981 | Franz | 428/432 |
| 4,276,350 | 6/1981 | Franz | 428/410 |
| 4,301,197 | 11/1981 | Franz et al. | 427/353 |
| 4,529,657 | 7/1985 | Franz | 428/410 |
| 4,617,057 | 10/1986 | Plueddemann | 106/2 |
| 4,724,022 | 2/1988 | Armstrong | 156/99 |
| 4,879,345 | 11/1989 | Connelly et al. | 525/104 |
| 4,944,962 | 7/1990 | Furuta et al. | 427/164 |
| 4,983,459 | 1/1991 | Franz et al. | 428/410 |
| 4,997,684 | 3/1991 | Franz et al. | 427/384 |
| 5,266,358 | 11/1993 | Uemura et al. | 427/376.2 |
| 5,294,252 | 3/1994 | Gun | 106/287.13 |
| 5,308,705 | 5/1994 | Franz et al. | 428/421 |
| 5,314,731 | 5/1994 | Yoneda et al. | 428/429 |
| 5,314,947 | 5/1994 | Sawaragi | 524/780 |
| 5,328,768 | 7/1994 | Goodwin | 428/428 |
| 5,368,892 | 11/1994 | Berquier | 427/299 |
| 5,413,865 | 5/1995 | Nakamura et al. | 428/432 |
| 5,421,866 | 6/1995 | Stark-Kasley et al. | 106/2 |
| 5,424,130 | 6/1995 | Nakanishi et al. | 428/410 |
| 5,425,804 | 6/1995 | Shinohara et al. | 106/2 |
| 5,489,328 | 2/1996 | Ono et al. | 106/2 |
| 5,523,161 | 6/1996 | Goodwin | 428/421 |
| 5,523,162 | 6/1996 | Franz et al. | 428/421 |

FOREIGN PATENT DOCUMENTS

| | | |
|---|---|---|
| 0 476 510 | 3/1992 | European Pat. Off. . |
| 0 492 545 | 7/1992 | European Pat. Off. . |
| 0 513 727 | 11/1992 | European Pat. Off. . |
| 0 545 201 | 6/1993 | European Pat. Off. . |
| 0 548 775 | 6/1993 | European Pat. Off. . |
| 0 719 743 | 7/1996 | European Pat. Off. . |
| 4218657 | 12/1992 | Germany . |
| 58-172244 | 10/1983 | Japan . |
| 61-278574 | 12/1986 | Japan . |
| 1-275674 | 11/1989 | Japan . |

OTHER PUBLICATIONS

Miall & Sharp, "A New Dictionary of Chemistry", 4th edition, p. 440.

*Primary Examiner*—Margaret W. Glass
*Attorney, Agent, or Firm*—Raymond J. Harmuth

[57] ABSTRACT a composition and method are disclosed whereby a substrate such as glass, plastic, metal, inorganic polymer coated substrate or inorganic coated substrate is provided with a durable non-wetting surface by treatment with a perfluoroalkylalkyl silane in a solvent which together form a composition which initially wets the surface. As the perfluoroalkylalkyl silane reacts with the surface, the remaining composition is repelled by the perfluoroalkylalkyl silane treated surface due to the difference between the surface tension of the solvent and the free energy of the treated surface, for expedient removal of the remaining composition from the treated surface.

45 Claims, 2 Drawing Sheets

AUTOPHOBIC WATER REPELLENT SURFACE TREATMENT

CROSS REFERENCE TO RELATED APPLICATION

This application is a continuation of U.S. application Ser. No. 08/458,149, filed Jun. 1, 1995, now abandoned, which is a continuation-in-part of U.S. application Ser. No. 08/220,353, filed Mar. 30, 1994, now abandoned, which is a continuation-in-part of U.S. application Ser. No. 07/589,235 filed Sep. 28, 1990, now U.S. Pat. No. 5,308,705, which is a continuation-in-part of U.S. application Ser. No. 07/503,587 filed Apr. 3, 1990, now U.S. Pat. No. 4,983,459.

BACKGROUND

The present invention relates generally to the art of surface treatment and, more particularly, to the art of producing a water repellent surface on various substrates, and most particularly to producing such a water repellent surface without applying excess material which must be removed.

U.S. Pat. No. 4,724,022 to Armstrong discloses an improved method of preparing a glass release surface useful in the manufacture of anti-lacerative window assemblies by treating the glass surface with (heptadecafluoro-1,1,2,2-tetrahydrodecyl)-1-trichlorosilane.

European Patent Application No. 92107814.3 (Publication Number 0 513 690 A2) of Yoneda et al. describes a surface-treated substrate having at least two treated surface layers wherein the first outermost layer is obtained by treatment with a compound forming a surface having a contact angle of at least 70° against water and the second underlayer is obtained by treatment with at least one reactive silane compound selected from isocyanate silane compounds and hydrolyzable silane compounds.

U.S. Pat. Nos. 4,983,459 and 4,997,684 to Franz et al. disclose an article and method respectively for providing a durable nonwetting surface on glass by treatment with a perfluoroalkylalkyl silane and a fluorinated olefin telomer.

U.S. Pat. No. 5,308,705 to Franz et al. describe providing nonwetting surface properties to substrates other than glass by treatment with a perfluoroalkylalkyl silane and a fluorinated olefin telomer.

U.S. Pat. No. 5,328,768 to Goodwin discloses a glass substrate the surface of which is treated with first a silica primer layer and second a perfluoroalkylalkyl silane.

U.S. Pat. No. 5,368,892 to Berquier describes a nonwettable glass sheet comprising a hydrophobic, oleophobic, UV resistant layer and a process for manufacturing the same, which includes cleaning the glass, contacting the glass with a solution containing a fluorinated organosilane in a nonpolar solvent system at a temperature ranging between −10° C. and 25° C. for at least 5 minutes, and rinsing.

SUMMARY OF THE INVENTION

Figure 1:
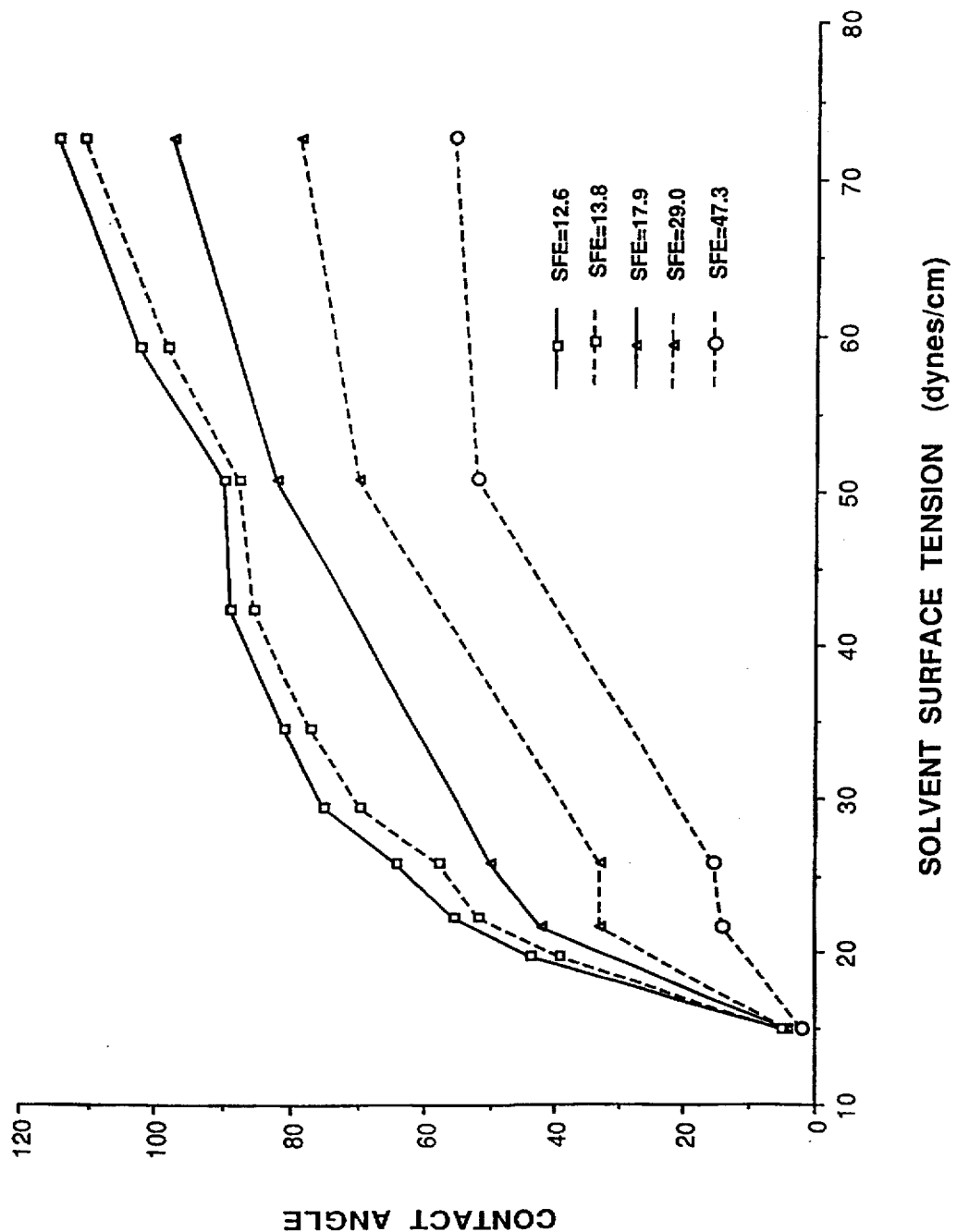
FIG. 1 illustrates the contact angle of a liquid drop as a function of solvent surface tension in dynes per centimeter on substrates having various surface free energies, measured in dynes per centimeter.

The present invention provides a substrate surface with high water repellency and high lubricity. Durable water and dirt repellency of a substrate surface are provided by applying to the substrate surface a composition comprising a perfluoroalkylalkyl silane compound and a solvent which renders the surface treatment autophobic, i.e. the composition initially wets the substrate surface, and as the substrate surface becomes treated with the perfluoroalkylalkyl silane, the composition is repelled by the treated substrate surface. The composition comprises at least one solvent for the perfluoroalkylalkyl silane. The composition comprises at least one solvent having a boiling point sufficiently high to prevent complete evaporation of solvent upon application of the perfluoroalkylalkyl silane, and a surface tension at least 5 dynes per centimeter higher than the surface free energy of the perfluoroalkylalkyl silane treated surface. The composition may comprise a single solvent or a mixture of solvents.

Description of the Preferred Embodiment

A composition comprising perfluoroalkylalkyl silane and solvent in accordance with the present invention is applied to the surface of a substrate to produce a surface treatment article. The perfluoroalkylalkyl silane and solvent composition is preferably employed as a suspension or solution, preferably in a solvent for the perfluoroalkylalkyl silane. The preferred solution of the present invention is applied to a substrate surface by any conventional technique such as dipping, flowing, wiping or spraying. The composition initially wets the surface, usually for about 0.2 to 2 seconds until the treated surface becomes sufficiently nonwetting to repel the remaining composition. As the perfluoroalkylalkyl silane reacts with the surface, and the treated surface repels the remaining composition, any excess composition can be easily removed, for example by wiping, without deposition of any excess silane as a thin hazy film which is difficult to remove and requires significant effort to eliminate.

Preferred perfluoroalkylalkyl silanes have the general formula $R_m R'_n SiX_{4-m-n}$, wherein R is a perfluoroalkylalkyl radical; m is typically one, n is typically zero or one, and m+n is not greater than 3; R' is a vinyl or alkyl radical, preferably methyl, ethyl or propyl; and X is preferably a radical such as halogen, acyloxy, and/or alkoxy. Preferred perfluoroalkylalkyl radicals preferably comprise perfluoroalkyl moieties which range from $CF_3$ to $C_{30}F_{61}$, preferably $C_6F_{13}$ to $C_{18}F_{37}$, and most preferably $C_8F_{17}$ to $C_{12}F_{25}$. The alkyl moiety of the perfluoroalkylalkyl radical is preferably ethyl. Preferred radicals for X include chloro, bromo, iodo, methoxy, ethoxy and acetoxy radicals. Preferred perfluoroalkylethylsilanes in accordance with the present invention include perfluoroalkylethyltrichlorosilane, perfluoroalkylethyltrimethoxysilane, perfluoroalkylethyltriacetoxysilane, perfluoroalkylethyldichloro(methyl)silane and perfluoroalkylethyldiethoxy(methyl)silane.

These perfluoroalkylethylsilanes appear to react with bonding sites at the substrate surface on a molecular basis. Strong surface bonding of the perfluoroalkylethylsilanes produces a durable substrate surface which exhibits a high contact angle with a drop of water, indicating high water repellency. The perfluoroalkylalkyl silane composition may further comprise a hydrolyzable silane capable of hydrolytic condensation to form a silica gel which acts as an integral primer. Preferred hydrolyzable silanes include fully hydrolyzable organosilanes, such as tetrahalosilanes, particularly tetrachlorosilane, $SiCl_4$.

Suitable solvents include those with relatively high boiling points, preferably above 65° C., and surface tensions greater than the surface free energy of the perfluoroalkylalkyl silane treated substrate surface by at least 5 dynes per centimeter (dynes/cm). The solvent may be a single solvent or a mixture of solvents, comprising at least one solvent for the perfluoroalkylalkyl silane and at least one solvent having the above properties. Also suitable are solvent mixtures which have at least one component which has a high boiling point, and either have fluid surface tensions which are at least 5 dynes/cm greater than the perfluoroalkylalkyl silane treated substrate surface, or change by selective evaporation during treatment of the substrate surface until the surface tension of the fluid is at least 5 dynes/cm greater than the free energy of the perfluoroalkylalkyl silane treated substrate surface. Preferred solvents and solvent systems include those which are aprotic, i.e. without —OH, —NH or —SH which can react with hydrolyzable groups on the perfluoroalkylalkyl silane, and have surface tensions greater than the surface free energy of the treated surface or are capable of selective evaporation to form a solvent system with a surface tension greater than the surface free energy of the treated surface.

Suitable solvents include high boiling, high surface tension solvents in the following families: normal, cyclic, and isoparaffinic alkanes such as hexane, heptane, cyclohexane, octane, hexadecane, and mixtures such as mineral spirits and Isopar solvents (product of Exxon); alkenes such as limonene; aromatic hydrocarbons such as toluene and xylenes; high boiling ethers such as n-butyl ether; ketones such as cyclopentanone, cyclohexanone, and methyl isobutyl ketone; halogenated hydrocarbons such as trichloroethane and chlorobenzene. Suitable solvents, particularly in solvent mixtures, may include isopropanol, ethanol, hexane, heptane, mineral spirits, acetone, toluene, and naphtha. Preferred solvents are high boiling alkanes, such as octanes, decanes, dodecanes and mixtures thereof; halogenated hydrocarbon solvents such as trichlorotrifluoroethane and methylene chloride; and perfluorinated organic compounds such as perfluorocarbons. Preferred solvents, for shipping considerations, are those without flash points or with flash points above 140° F. (60° C.). Preferred solvents include 1,1,1-trichloroethane, alkanes such as dodecane and hexadecane, and commercially available mixtures such as Isopar solvents, grades L, M, and V, from Exxon Corp. In all cases, the solvent or one component of the solvent mixture, preferably at least 1 percent in concentration, is of sufficiently high boiling point so as not to evaporate within about one minute of coating application.

Some suitable solvents, along with their surface tension, boiling temperature and flash point properties are listed in the following Table.

| Suitable Solvents | Surface Tension (Dynes/cm) | Boiling Point or Range (°C.) | Flash Point (°F.) |
|---|---|---|---|
| hexane | 18.4 | 69 | −10 |
| heptane | 19.7 | 96 | 30 |
| cyclohexane | 25.5 | 81 | −1 |
| n-octane | 21.8 | 126 | 60 |
| mineral spirits | 25.3 | 177 | −135 |
| VM&P naphtha | 22 | 127 | |
| dodecane | 25.4 | 216 | 160 |
| n-hexadecane | | 287 | 275 |
| Isopar C | 21.2 | 98–104 | 19 |
| Isopar E | 22.5 | 118–137 | 45 |
| Isopar G | 23.5 | 160–174 | 106 |
| Isopar H | 24.9 | 178–188 | 129 |
| Isopar K | 25.9 | 177–197 | 135 |

-continued

| Suitable Solvents | Surface Tension (Dynes/cm) | Boiling Point or Range (°C.) | Flash Point (°F.) |
|---|---|---|---|
| Isopar L | 25.9 | 191–207 | 147 |
| Isopar M | 26.6 | 223–252 | 196 |
| Isopar V | 30.8 | 273–311 | 264 |
| limonene | | 178 | 119 |
| toluene | 28.5 | 110 | 40 |
| o-xylene | 30.1 | 144 | 90 |
| n-butyl ether | 22.9 | 142 | 77 |
| cyclopentanone | | 131 | 87 |
| cyclohexanone | 35.2 | 155 | 116 |
| methyl isobutyl ketone | 24.5 | 115 | 56 |
| 1,1,1-trichloroethane | 25.8 | 74 | none |
| chlorobenzene | 33.6 | 132 | 75 |

If the perfluoroalkylalkyl silane comprises readily hydrolyzable groups, such as chloro, the solvent preferably excludes water and alcohols such as ethanol and isopropanol, which can react with the perfluoroalkylalkyl silane, leaving it less capable of reacting with the substrate surface. For the particularly preferred perfluoroalkylalkyl silanes, such as the perfluoroalkylalkyl dichloro- and trichloro-silanes, the solvent or solvent mixture is preferably anhydrous. Solvents may be passed through conventional drying agents such as anhydrous, magnesium sulfate or silica gel. Various preferred solvents, such as the high boiling alkanes, may include a reactive drying agent, such as thionyl chloride, to remove any trace of water which would otherwise react with the perfluoroalkylalkyl silane.

Thionyl chloride ($SOCl_2$) is a member of a class of reactive drying agents. Most drying agents work by complexing water present in the solvent. The water is still present in systems that rely on complexation. Reactive drying agents, for the instant invention, are those that react with the water to form other compounds which do not contain water and preferably do not produce other —OH containing moieties that are reactive with chlorosilanes. Other reactive drying agents include sulfur monochloride ($S_2Cl_2$), phosphorus pentachloride ($PCl_5$) sulfuryl chloride ($SO_2Cl_2$), and phosphorus trichloride ($PCl_3$).

Concentrations of about 0.005 to 50, preferably about 0.05 to 5, percent of perfluoroalkylalkyl silane in the solvent or solvent mixture are preferred. The composition is preferably applied to the substrate surface by wiping, dipping or spraying followed by removal by air blow off, gravity draining or wiping while some of the composition remains on the treated surface in a form which is repelled by the treated surface due to the remaining solvent having a significantly higher surface tension, preferably at least 5 dynes/cm greater, than the surface free energy of the treated surface. This retraction of the solvent from the treated surface provides for easy pickup and removal of the remaining composition without deposition of a thin film of excess perfluoroalkylalkyl silane component which forms a haze which may be difficult to remove, and which may require more time and effort to remove than the time required for application of the composition.

After any remaining solvent is evaporated, preferably simply by drying in air at ambient temperature, the perfluoroalkylalkyl silane may be cured to form a more durable coating. Preferably, curing is accomplished by heating the perfluoroalkylalkyl silane treated surface. Typically, curing temperatures of at least 150° F. (about 66° C.) are preferred, particularly above 200° F. (about 93° C.). A cure cycle of about 200° F. (about 93° C.) for about 30 minutes is suitable. Higher temperatures and shorter heating times may be more efficient. A cure cycle of 2 to 5 minutes at 400° to 500° F. (about 204° to 260° C.) may be preferred, particularly about 3 minutes at about 470° F. (about 243° C.).

The contact angles recited herein are measured by the sessile drop method using a modified captive bubble indicator manufactured by Lord Manufacturing, Inc., equipped with Gaertner Scientific Goniometer optics. The surface to be measured is placed in a horizontal position, facing upward, in front of a light source. A drop of water is placed on top of the surface in front of the light source so that the profile of the sessile drop can be viewed and the contact angle measured through the goniometer telescope equipped with circular protractor graduation.

FIG. 1 shows that fluids with very low surface tension, such as perfluorocarbons, can easily wet the treated surfaces, even the most repellent. During the application of perfluoroalkylethyltrichlorosilane coatings by wiping, the surface free energy is generally lowered from about 73 dynes/cm for the glass surface to about 12 dynes/cm for the perfluoroalkylalkyl silane treated glass surface. During this time, a solvent system with a constant surface tension of about 20 to 70 dynes/cm shows initial wetting of the surface followed by de-wetting after the surface has been partially coated. FIG. 1 illustrates that by choosing a solvent surface tension and moving from the x-axis upward, as the coating is applied and the surface free energy is lowered, the contact angle of the solvent on the coating increases.

Figure 2:
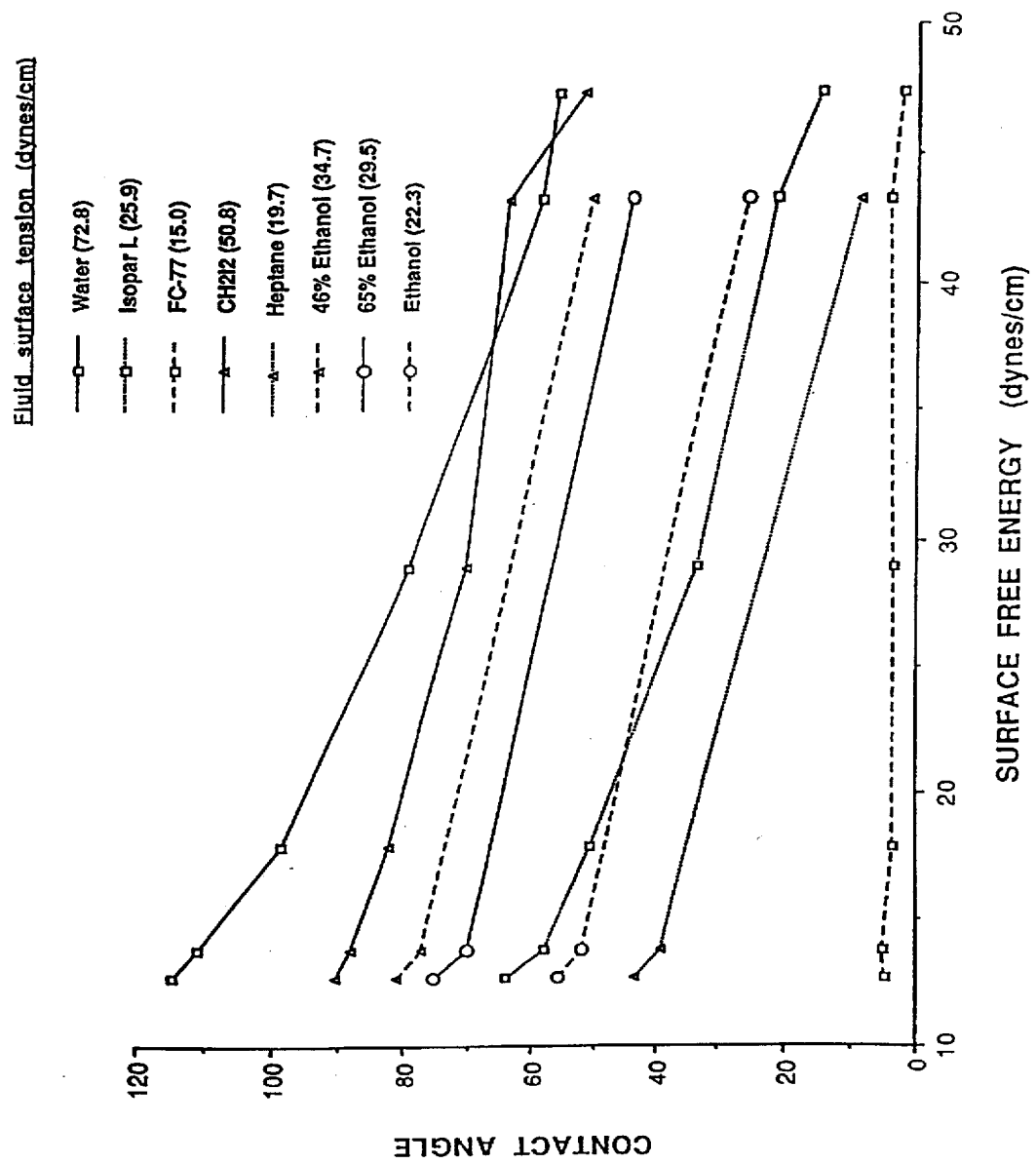
FIG. 2 illustrates the contact angle of a liquid drop as a function of surface free energy in dynes per centimeter of various fluids, the surface tensions of which are measured in dynes per centimeter.

FIG. 2 illustrates more clearly that for a surface modified to be more repellent, fluids with surface tension greater than about 20 dynes/cm become repelled by the surface, while fluid with a surface tension of about 15 dynes/cm still have a low contact angle. Higher contact angles reduce the evaporation rate of solvents due to "beading up" which reduces the surface area of the drop which, in turn, reduces the evaporation rate of the solvent. Also, as the solvent beads, the surface repels the solvent more, which allows a paper towel to remove the solvent cleanly from the surface.

The present invention will be further understood from the descriptions of specific examples which follow.

EXAMPLE 1

A first coating solution is prepared comprising 1.2 percent by weight perfluoroalkylethyltrichlorosilanes, wherein the alkyl comprises primarily $C_6$ to $C_{18}$ chain lengths, in a solvent system comprising equal weights of Freon® TF trichlorotrifluoroethane (Freon is a registered trademark of DuPont) and hexadecane. A second coating solution is prepared as above except that the solvent consists entirely of Freon TF. These two solutions were used to render float glass samples water repellent by a simple wiping procedure. During application of the two solutions, the second coating solution wiped onto the glass surface like wax, and left a film of excess material, while the first coating solution, within a short time of application, was repelled from the treated surface sufficiently to cause the solution to "bead up"; the hexadecane did not readily evaporate due to its high boiling point. The "beaded up" first solution was readily removed by simple wiping. Removal of the excess material from the second coating solution required solvent, extra towels and considerable buffing effort.

The surface treated glass coupons were exposed to condensing humidity in the Cleveland Condensing Cabinet (CCC), constantly condensing water vapor at 140° F. (60° C.). The efficiency of the treatment is measured by the contact angle formed by a drop of water on the surface. The results are reported in the following table.

| CCC | Contact Angle (°) | |
|---|---|---|
| (hours) | First Solution | Second Solution |
| 0 | 103 | 105 |
| 48 | 106 | 103 |
| 119 | 109 | 107 |
| 377 | 112 | 110 |
| 544 | 106 | 107 |
| 783 | 98 | 102 |
| 948 | 81 | 89 |
| 1138 | 75 | 82 |

The above results indicate similar durability of the coating provided by the two formulations. However, the first solution was significantly easier to apply due to the repellent nature of the treated surface once the low surface tension, low boiling component (Freon TF) evaporated.

EXAMPLE 2

Several glass coupons were coated with coating solutions to render the glass hydrophobic. Each coating solution was based upon the same perfluoroalkylethyltrichlorosilanes as used in Example 1, but solvents and concentrations were varied. Some of the samples were weathered in outdoor Pittsburgh exposure inclined 45° to horizon, facing south. The treated coupons were evaluated by the contact angles of various solvents on these treated surfaces. The surface free energy (SFE) was calculated by the use of the contact angles of methylene iodide and water for each glass surface, as described by Owens and Wendt (J. Appl. Poly. Sci. 1969, 13, 1741). The most repellent treated surfaces are those represented by low surface free energies, such as 12.6 dynes/cm. The most weathered treated surface has the highest surface free energy, 47.3 dynes/cm; this treated surface is still significantly repellent to water, exhibiting a contact angle of 56°. The contact angle data are illustrated in FIGS. 1 and 2.

EXAMPLE 3

Four solutions were prepared as follows. Solution A was prepared by dissolving 0.5 weight percent each of silicon tetrachloride and perfluorooctylethyltrichlorosilane in Isopar L solvent, a mixture of hydrocarbons available from Exxon Corp., which has a surface tension of 25.9 dynes/cm and a boiling temperature range of 191° to 207° C. Solution B was prepared by dissolving 0.5 weight percent each of silicon tetrachloride and perfluorooctylethyltrichlorosilane in Fluorinert FC-77, a fluorinated solvent available from 3M Corp., which has a surface tension of 15.0 dynes/cm and a boiling point of 97° C. Solution C was prepared by dissolving 0.5 weight percent perfluorooctylethyltrichlorosilane in Isopar L, and Solution D was prepared by dissolving 0.5 weight percent perfluorooctylethyltrichlorosilane in Fluorinert FC-77. Each solution was wiped on glass coupons, which had been polished with an alumina polishing agent to obtain a clean surface, at 63° F. (17° C.) and approximately 70 percent relative humidity. The amount of haze was measured with a Pacific Scientific XL211 Hazegard System. Haze levels of 0.0 to 0.1 percent are generally not observable with the unaided eye, and treated substrates with this level of haze can be considered clear for normal viewing purposes. The haze values of glass treated with the four solutions are listed below:

| Solution | SiCl₄ (weight %) | C₈F₁₇C₂H₄SiCl₃ (weight %) | Solvent (weight %) | Solvent | Haze (%) |
|---|---|---|---|---|---|
| A | 0.5 | 0.5 | 99 | Isopar L | 0.1 |
| B | 0.5 | 0.5 | 99 | FC-77 | 8.1 |
| C | 0 | 0.5 | 99.5 | Isopar L | 0.0 |
| D | 0 | 0.5 | 99.5 | FC-77 | 11.8 |

As can be seen from the above data, solutions B and D which used low boiling point fluorocarbon solvent (Fluorinert FC-77) had significant haze levels, while solutions A and C which used high boiling point hydrocarbon solvent (Isopar L) did not. The higher boiling point and higher surface tension of the hydrocarbon solvent (Isopar L) resulted in this significant difference in haze.

EXAMPLE 4

A solution was prepared comprising 99 grams of high boiling point hydrocarbon solvent (Isopar L), 0.5 grams of thionyl chloride ($SOCl_2$), and 0.5 grams of perfluoroalkylethyltrichlorosilanes, wherein the perfluoroalkyl moiety comprises primarily $C_6F_{13}$ to $C_{18}F_{37}$. This solution was used to render float glass water repellent by a simple wiping procedure. During application of the solution, the solution was repelled sufficiently to cause the solution to "bead up" and be easily removed from the surface without deposition of observable excess siloxane material. The thionyl chloride was used to dry the hydrocarbon solvent. The surface treated glass coupons were exposed to condensing humidity in the Cleveland Condensing Cabinet (CCC), constantly condensing water vapor at 140° F. (60° C.), and also exposed to cyclic UV light and humidity in a QUV Tester, with cycles of 8 hours UV at low relative humidity at a black panel temperature of 65° C. followed by 4 hours of near 100 percent relative humidity at 50° C. The efficiency of the perfluoroalkylalkyl silane surface treatment is measured by the contact angle formed by a drop of water on the treated substrate surface. The results are reported in the following table:

| CCC Exposure (hours) | Contact Angle (°) | |
|---|---|---|
| | Tin Surface | Atmosphere Surface |
| 0 | 117 | 117 |
| 188 | 80 | 86 |
| 355 | 72 | 76 |

| QUVB-313 Exposure (hours) | Contact Angle (°) | |
|---|---|---|
| | Tin Surface | Atmosphere Surface |
| 0 | 118 | 118 |
| 185 | 109 | 114 |
| 351 | 101 | 113 |

The above examples are offered to illustrate the present invention. Various perfluoroalkylalkyl silanes, organosilanes, solvents and concentrations may be applied by any conventional technique, and optionally cured at suitable temperatures for adequate times to provide durable non-wetting surfaces to any of a variety of glass and plastic substrates, as well as other inorganic surfaces such as metals, ceramics, enamels, and metal or metal oxide films. The treated substrates of the present invention are especially suitable in automobile and other vehicle, including aircraft, parts, as well as in building components, antireflective lenses and CRT cover plates.

I claim:

1. A composition for producing a nonwetting surface on a substrate comprising a perfluoroalkylalkyl silane selected from compounds having the general formula $R_mR'_nSiX_{4-m-n}$, wherein R is a perfluoroalkylalkyl radical, R' is an alkyl or vinyl radical, m is 1, n is 0 or 1 and X is selected from the group consisting of halogen, alkoxy and acyloxy radicals wherein the perfluoroalkyl moiety of the perfluoroalkylalkyl radical is selected from $CF_3$ to $C_{30}F_{61}$ in a solvent said solvent consisting essentially of an aprotic solvent having a surface tension at least 5 dynes per centimeter higher than the surface free energy of the substrate, a boiling point sufficiently high to prevent evaporation of the solvent during application of the composition to the surface of the substrate and selected from the group consisting of toluene, naptha, chlorobenzene, ethers, ketones, perfluorinated organic compounds and mixtures thereof.

2. The composition according to claim 1, wherein said solvent comprises a solvent selected from the group consisting of toluene, n-butyl ether, acetone, cyclopentanone, cyclohexanone, methyl isobutyl ketone, naphtha chlorobenzene, perfluorocarbons and mixtures thereof.

3. The composition according to claim 2 wherein the solvent has a boiling point of at least 65° C.

4. The composition according to claim 3, wherein R' is selected from the group consisting of methyl, ethyl, vinyl and propyl.

5. The composition according to claim 4, wherein X is selected from the group consisting of chloro, bromo, iodo, methoxy, ethoxy and acetoxy.

6. The composition according to claim 3, wherein said composition further comprises a completely hydrolyzable silane capable of hydrolytic condensation to silica gel.

7. The composition of claim 6 wherein said solvent further comprises a reactive drying agent.

8. The composition of claim 1 wherein said perfluoroalkylalkyl silane comprises a perfluoroalkylalkyl silane selected from the group consisting of a perfluoroalkylalkyl chlorosilane, a perfluoroalkylalkyl dichlorosilane and a perfluoroalkylalkyl trichlorosilane and said solvent includes a reactive drying agent.

9. The composition according to claim 1, wherein the perfluoroalkylalkyl silane consists essentially of compounds having the general formula $R_mR'_nSiX_{4-m-n}$, wherein R is a perfluoroalkylalkyl radical, R' is an alkyl or vinyl radical, m is 1, n is 0 or 1, and X is selected from the group consisting of halogen, alkoxy and acyloxy radicals wherein the perfluoroalkyl moiety of the perfluoroalkylalkyl radical is selected from $CF_3$ to $C_{30}F_{61}$.

10. The composition according to claim 9, wherein the perfluoroalkyl moiety of the perfluoroalkylalkyl radical is selected from $C_8F_{16}$ to $C_{12}F_{25}$.

11. The composition according to claim 9, wherein the solvent has a boiling point of at least 65° C.

12. The composition according to claim 11, wherein said solvent comprises a solvent selected from the group consisting of toluene, acetone, naphtha and mixtures thereof.

13. The composition according to claim 12, wherein R' is selected from the group consisting of methyl, ethyl, vinyl and propyl.

14. The composition according to claim 12, wherein X is selected from the group consisting of chloro, bromo, iodo, methoxy, ethoxy and acetoxy.

15. The composition according to claim 12, wherein said composition further comprises a completely hydrolyzable silane capable of hydrolytic condensation to silica gel.

16. A method of producing a non-wetting surface on a substrate comprising the steps of:

preparing a solution of a perfluoroalkylalkyl silane selected from compounds having the general formula $R_mR'_nSiX_{4-m-n}$, wherein R is a perfluoroalkylalkyl radical, R' is an alkyl or vinyl radical, m is 1, n is 0 or 1, and X is selected from the group consisting of halogen, alkoxy and acyloxy radicals wherein the perfluoroalkyl moiety of the perfluoroalkylalkyl radical is selected from $CF_3$ to $C_{30}F_{61}$ in a solvent said solvent consisting essentially of an aprotic solvent having a surface tension at least 5 dynes per centimeter higher than the surface free energy of the substrate, a boiling point sufficiently high to prevent complete evaporation of the solvent during application and selected from the group consisting of toluene, naptha, chlorobenzene, ethers, ketones, perfluorinated organic compounds and mixtures thereof;

contacting a surface of the substrate with the solution wherein the boiling point of the solvent prevents complete evaporation of the solvent during application of the solution to the surface of the substrate.

17. The method according to claim 16, wherein the solvent has a boiling point of at least 65° C.

18. The method according to claim 17, wherein said preparing step further includes the solution comprising a completely hydrolyzable silane capable of hydrolytic condensation to silica gel.

19. The method according to claim 16, wherein during the practice of the contacting step the perfluoroalkylalkyl silane consists essentially of compounds having the general formula $R_mR'_nSiX_{4-m-n}$, wherein R is a perfluoroalkylalkyl radical, R' is an alkyl or vinyl radical, m is 1, n is 0 or 1 and X is selected from the group consisting of halogen, alkoxy and acyloxy radicals wherein the perfluoroalkyl moiety of the perfluoroalkylalkyl radical is selected from $CF_3$ to $C_{30}F_{61}$.

20. The method according to claim 19, wherein the solvent has a boiling point of at least 65° C.

21. The method according to claim 20, wherein said preparing step further includes the solution further comprising a completely hydrolyzable silane capable of hydrolytic condensation to silica gel.

22. The method of claim 16 wherein said perfluoroalkylalkyl silane comprises a perfluoroalkylalkyl silane selected from the group consisting of a perfluoroalkylalkyl chlorosilane, a perfluoroalkylalkyl dichlorosilane and a perfluoroalkylalkyl trichlorosilane and said solvent includes a reactive drying agent.

23. The method of claim 19 wherein said solvent further comprises a reactive drying agent.

24. A composition for producing a nonwetting surface on a substrate comprising a perfluoroalkylalkyl silane, the perfluoroalkylalkyl silane is selected from compounds having the general formula $R_mR'_nSiX_{4-m-n}$, wherein R is a perfluoroalkylalkyl radical, R' is an alkyl or vinyl radical, m is 1, n is 0 or 1 and m+n is not greater than 3, and X is selected from the group consisting of halogen, alkoxy and acyloxy radicals wherein the perfluoroalkyl moiety of the perfluoroalkylalkyl radical is selected from $CF_3$ to $C_{30}F_{61}$ in a solvent said solvent consisting essentially of an aprotic solvent having a surface tension at least 5 dynes per centimeter higher than the surface free energy of the substrate, a boiling point sufficiently high to prevent evaporation of the solvent during application of the composition to the surface of the substrate and selected from the group consisting of hexanes, heptanes, methylene chloride, naphtha, toluene acetone, perfluorocarbons and mixtures thereof.

25. The composition according to claim 24, wherein the solvent has a boiling point of at least 65° C.

26. The composition according to claim 25, wherein R' is selected from the group consisting of methyl, ethyl, vinyl and propyl.

27. The composition according to claim 25, wherein X is selected from the group consisting of chloro, bromo, iodo, methoxy, ethoxy and acetoxy.

28. The composition according to claim 25, wherein the perfluoroalkyl moiety of the perfluoroalkylalkyl radical is selected from $C_6F_{13}$ to $C_{12}F_{25}$.

29. The composition according to claim 25, wherein said composition further comprises a completely hydrolyzable silane capable of hydrolytic condensation to silica gel.

30. The composition according to claim 24, wherein the perfluoroalkylalkyl silane consists essentially of compounds having the general formula $R_mR'_nSiX_{4-m-n}$, wherein R is a perfluoroalkylalkyl radical, R' is an alkyl or vinyl radical, m is 1, n is 0 or 1, and X is selected from the group consisting of halogen, alkoxy and acyloxy radicals wherein the perfluoroalkyl moiety of the perfluoroalkylalkyl radical is selected from $CF_3$ to $C_{30}F_{61}$.

31. The composition according to claim 30, wherein the solvent has a boiling point of at least 65° C.

32. The composition according to claim 31, wherein said composition further comprises a completely hydrolyzable silane capable of hydrolytic condensation to silica gel.

33. The composition according to claim 32, wherein R' is selected from the group consisting of methyl, ethyl, vinyl and propyl.

34. The composition according to claim 32, wherein X is selected from the group consisting of chloro, bromo, iodo, methoxy, ethoxy and acetoxy.

35. The composition according to claim 32, wherein the perfluoroalkyl moiety of the perfluoroalkylalkyl radical is selected from $C_8F_{16}$ to $C_{12}F_{25}$.

36. The composition of claim 24 wherein said perfluoroalkylalkyl silane comprises a perfluoroalkylalkyl silane selected from the group consisting of a perfluoroalkylalkyl chlorosilane, a perfluoroalkylalkyl dichlorosilane and a perfluoroalkylalkyl trichlorosilane and said solvent includes a reactive drying agent.

37. The composition of claim 29 wherein said solvent further comprises a reactive drying agent.

38. A method of producing a non-wetting surface on a substrate comprising the steps of:

preparing a solution of a perfluoroalkylalkyl silane selected from compounds having the general formula $R_mR'_nSiX_{4-m-n}$, wherein R is a perfluoroalkylalkyl radical, R' is an alkyl or vinyl radical, m is 1, n is 0 or 1 and m+n is not greater than 3, and X is selected from the group consisting of halogen, alkoxy and acyloxy radicals wherein the perfluoroalkyl moiety of the perfluoroalkylalkyl radical is selected $CF_3$ to $C_{30}F_{61}$ and in a solvent, said solvent consisting essentially of an aprotic solvent having a surface tension at least 5 dynes per centimeter higher than the surface free energy of the substrate, a boiling point sufficiently high to prevent complete evaporation of the solvent during application of the solution and selected from the group consisting of hexanes, heptanes, methylene chloride, naphtha, toluene, acetone, perfluorocarbons and mixtures thereof;

contacting a surface of the substrate with the solution wherein the boiling point of the solvent prevents complete evaporation of the solvent during application to the substrate surface.

39. The method according to claim 38, wherein the solvent has a boiling point of at least 65° C.

40. The method according to claim 39, wherein said preparing step further includes the composition further comprising a completely hydrolyzable silane capable of hydrolytic condensation to silica gel.

41. A method according to claim 38, wherein during the practice of the controlling step the perfluoroalkylalkyl silane consist essentially of compounds having the general formula $R_m R'_n SiX_{4-m-n}$, wherein R is a perfluoroalkylalkyl radical, R' is a alkyl or vinyl radical, m is 1, n is 0 or 1, and X is selected from the group consisting of halogen, alkoxy and acyloxy radicals wherein said perfluoroalkyl moiety of the perfluoroalkyalkyl radical is selected from $CF_3$ to $C_{30}F_{61}$.

42. The method according to claim 41, wherein the solvent has a boiling point of at least 65° C.

43. The method according to claim 42, wherein said preparing step further includes the composition further comprising a completely hydrolyzable silane capable of hydrolytic condensation to silica gel.

44. The method of claim 38 wherein said perfluoroalkylalkyl silane comprises a perfluoroalkyalkyl silane selected from the group consisting of a perfluoroalkylalkyl chlorosilane, a perfluoroalkylalkyl dichlorosilane and a perfluoroalkylalkyl trichlorosilane and said solvent includes a reactive drying agent.

45. The method of claim 40 wherein said solvent further comprises a reactive drying agent.

* * * * *